United States Patent [19]

Drouot et al.

[11] Patent Number: 5,221,645
[45] Date of Patent: Jun. 22, 1993

[54] COMPOSITE SHAPED ARTICLES COMPRISING REINFORCED VITREOUS MATRICES

[75] Inventors: Claudette Drouot, Juillan; Paul Goursat, Verneuil-sur-Vienne; Bernard Lengronne, Montsegur; Christophe Seraudie, Meyssac, all of France

[73] Assignee: Ceramiques et Composites, Courbevoie, France

[21] Appl. No.: 540,166

[22] Filed: Jun. 19, 1990

[30] Foreign Application Priority Data

Jun. 21, 1989 [FR] France .................. 89 08259

[51] Int. Cl.$^5$ .................. C03C 3/085; C03C 14/00
[52] U.S. Cl. .................. 501/32; 501/69; 501/72; 501/95; 264/58; 264/60
[58] Field of Search .................. 501/69, 72, 32, 95; 264/58, 60

[56] References Cited

U.S. PATENT DOCUMENTS

| | | | |
|---|---|---|---|
| 4,095,986 | 6/1978 | Matsuda et al. | 501/69 X |
| 4,412,854 | 11/1983 | Layden | 501/95 X |
| 4,415,672 | 11/1983 | Brennan et al. | 501/7 X |
| 4,485,179 | 11/1984 | Brennan et al. | 501/32 |
| 4,581,053 | 4/1986 | Prewo et al. | 501/32 X |
| 4,615,987 | 10/1986 | Chyung et al. | 501/32 X |
| 4,673,658 | 6/1987 | Gadkaree et al. | 531/95 X |
| 4,696,710 | 9/1987 | Minjolle et al. | 264/60 X |
| 4,857,485 | 8/1989 | Brennan et al. | 501/69 X |

FOREIGN PATENT DOCUMENTS

| | | |
|---|---|---|
| 0095433A1 | 11/1983 | European Pat. Off. . |
| 0128409A1 | 12/1984 | European Pat. Off. . |
| 025523A1 | 2/1988 | European Pat. Off. . |
| 0290146A1 | 11/1988 | European Pat. Off. . |

Primary Examiner—Karl Group
Attorney, Agent, or Firm—Burns, Doane, Swecker & Mathis

[57] ABSTRACT

Composite shaped articles, well adapted for aerospace applications, include a vitreous matrix and an effective amount of a reinforcing agent therefor, preferably a fibrous and ceramic reinforcing agent, such vitreous matrix being based on silica, alumina, zirconia, an alkali metal oxide and an alkaline earth metal oxide, in the following proportions by weight relative to the total weight of the matrix:

| | | | | | |
|---|---|---|---|---|---|
| (1) | 50% | ≦ | $SiO_2$ | ≦ | 80% |
| (2) | 7% | ≦ | $Al_2O_3$ | ≦ | 20% |
| (3) | 2% | ≦ | $ZrO_2$ | ≦ | 10% |
| (4) | 2% | ≦ | $\Sigma A_2O$ | ≦ | 7% |
| (5) | 4% | ≦ | $\Sigma BO$ | ≦ | 10% | wherein $\Sigma A_2O$ and $\Sigma BO$ represent the respective total amounts by weight of the alkali metal oxides and the alkaline earth metal oxides present in said matrix.

20 Claims, No Drawings

COMPOSITE SHAPED ARTICLES COMPRISING REINFORCED VITREOUS MATRICES

BACKGROUND OF THE INVENTION

1. Field of the Invention

The present invention relates to novel composite materials comprising a reinforced vitreous matrix, and to a process for the production thereof.

2. Description of the Prior Art

Composite materials comprising a vitreous matrix and, in particular, a reinforcing amount of fibers, are currently of great technical interest in light of their good thermomechanical properties. For this reason, they may advantageously be used in the aeronautical and aerospace fields for applications requiring good strength at intermediate temperatures, i.e., on the order of 600° to 1,000° C.

However, most of the materials of this type developed to date are not completely satisfactory, both relative to their final properties and to the processing thereof.

Among the most widely used and best performing composite materials comprising vitreous matrices, a distinction may be made between those having a matrix essentially of a borosilicate glass, with a $B_2O_3$ content on the order of 10% to 30% by weight, and those having a matrix essentially based on silica, i.e., having a silica content greater than 95% weight.

The first type presents the major disadvantage of low corrosion resistance due to the presence of the $B_2O_3$ oxide, which is particularly sensitive to hydrolysis, and the second type may have mechanical properties, particularly relative to impact strength, that are insufficient for certain applications.

The technique most typically employed for the production of such materials entails impregnating a fiber preform (reinforcing agent) with a slip containing, in various forms, all of the constituents required to provide the desired vitreous composition, then drying the thus impregnated preform.

The stages of impregnating and drying may be repeated until a prepreg is obtained having the desired amount by volume of fibrous reinforcement and/or a plurality of prepregs is stacked into an array and made integral by heating the dried prepregs at moderate temperatures in order to produce large size mono- or bidirectionally reinforced composites. Finally, the preform is densified in a compression stage at elevated temperatures. This latter stage, having in particular the purpose of making the glass flow through the strands of the preform, requires a relatively low viscosity of the glass (less than $10^7$ poises) and thus a high compression temperature.

Hence, to obtain suitable results relative to density and thermomechanical properties, it is known that borosilicate glasses (glass transition temperature Tg on the order of 530° C.) must be compressed at temperatures of at least about 1,150° to 1,200° C., while for glasses based essentially on silica (Tg on the order of 850° C.) this temperature is about 1,400° to 1,600° C. These high pressing temperatures entail the risk of damaging the fibers which constitute the reinforcing structure.

It is also known to this art that the limit on the temperatures of intended utilization of such composite materials having a glassy matrix is determined by the glass transition temperature of the glass and that, generally, this limit is approximately Tg+100° C.; it is thus found that the application temperature of a composite having a borosilicate matrix is limited to 600° C. and that of a composite having a silica matrix to 1000° C.

It is thus seen that for the materials of the prior art there exists a very large differential between their application temperature, or temperature of intended utilization ($T_u$) and the compression temperature ($T_p$) that is required for the production thereof. This results in an appreciable reduction in their economic and/or industrial worth.

SUMMARY OF THE INVENTION

Accordingly, a major object of the present invention is the provision of novel composite materials comprising reinforced vitreous matrices in which the ($T_p-T_u$) differential (i.e., the difference between the hot pressing temperature and the temperature limiting the intended utilization thereof) is as low as possible.

Another object of the present invention is the provision of novel composite materials comprising reinforced vitreous matrices having improved mechanical properties at elevated temperatures.

Briefly, the present invention features novel composite materials comprising a vitreous matrix and a reinforcing agent therefor, and wherein such vitreous matrix is based on silica, alumina, zirconia, and alkali metal and alkaline earth metal oxides, in the following weight proportions relative to the total weight of the matrix:

| (1) | 50% | ≦ | $SiO_2$ | ≦ | 80% |
| --- | --- | --- | --- | --- | --- |
| (2) | 7% | ≦ | $Al_2O_3$ | ≦ | 20% |
| (3) | 2% | ≦ | $ZrO_2$ | ≦ | 10% |
| (4) | 2% | ≦ | $\Sigma A_2O$ | ≦ | 7% |
| (5) | 4% | ≦ | $\Sigma BO$ | ≦ | 10% | in which $\Sigma A_2O$ and $\Sigma BO$ respectively represent the total amount by weight of the alkali metal oxides and the alkaline earth metal oxides present in said matrix.

This invention also features a process for the preparation of the above novel composite materials, comprising:

(a) impregnating a reinforcing agent with a slip containing the constituents constituting the desired vitreous matrix;

(b) drying the thus impregnated reinforcing agent;

(c) optionally repeating the stages of impregnation/drying until a prepreg is obtained having the desired amount by volume of reinforcing fibers;

(d) optionally stacking and consolidating identical prepregs to provide large size composites reinforced either mono- or bidirectionally; and (e) densifying the resulting preform.

DETAILED DESCRIPTION OF THE PREFERRED EMBODIMENTS OF THE INVENTION

More particularly according to the present invention, the subject novel composites have a utilization temperature limit on the order of 900° C. and a low hot pressing temperature on the order of 1,150° C. They exhibit a high degree of densification, zero or quasi-zero open porosity and, finally, a very good corrosion resistance.

In addition to the fact that they have a small ($T_p-T_u$) differential on the order of 250° C., these composites also have favorable mechanical properties. Their impact strength at elevated temperatures is improved, i.e., their mechanical properties at lower temperatures are maintained at high temperatures, even in an oxidizing atmosphere. The matrices of the composites of the invention have coefficients of expansion on the same order as those of the reinforcing agents.

As indicated above, the vitreous matrix of the composite materials according to the invention is based on silica, alumina, zirconia, and the alkali metal and alkaline earth metal oxides, in the proportions indicated.

In a preferred embodiment of the invention, the composition of the matrix is such that the ratio $\Sigma A_2O/\Sigma BO$ ranges from 0.2 to 1.

In another preferred embodiment of the invention, the respective proportions of the constituents of the matrix are the following:

| | | | | |
|---|---|---|---|---|
| 65% | ≦ | $SiO_2$ | ≦ | 75% |
| 10% | ≦ | $Al_2O_3$ | ≦ | 15% |
| 2% | ≦ | $ZrO_2$ | ≦ | 8% |
| 3% | ≦ | $\Sigma A_2O$ | ≦ | 6% |
| 6% | ≦ | $\Sigma BO$ | ≦ | 10% | in particular when the aforementioned $\Sigma A_2O/\Sigma BO$ ratio ranges from 0.4 to 0.8.

As regards the alkali metals according to the invention, lithium, sodium, potassium and cesium are typically used, whether alone or in any combination thereof.

In a preferred embodiment of the invention, the alkali metal is essentially potassium.

It is especially advantageous that the amount of $Na_2O$ in the vitreous matrix should not exceed 1% and preferably it is less than 0.5% by weight, in order to limit the coefficient of expansion of the matrix.

According to the invention, it is also desirable that the $Li_2O$ content in the vitreous matrix should not exceed 0.5% by weight, in order to improve the corrosion resistance of the composite; preferably, this amount should be virtually zero.

As regards the alkaline earth metals, magnesium, calcium, barium and strontium are typically used, with the first three being preferred.

The reinforcing agents preferably are fibrous ceramic reinforcing agents which comprise an organized or random assembly of long and continuous ceramic fibers (filaments). Such fibers may be incorporated into the matrix in a unidirectional configuration, or in the form of a fabric or nonwoven mat, or also in a multidirectional (polydirectional) configuration.

The reinforcing agent may also comprise short fibers and/or whiskers, oriented in a random fashion within the matrix.

Continuous filaments in combination with whiskers and/or short fibers may also be used as the reinforcing agents, well dispersed within the matrix.

From the point of view of mechanical strength, the preferred composite materials according to the invention are those comprising unidirectional fiber reinforcements, i.e., fibers that are substantially parallel to each other and oriented in the same and only direction (Composite 1D), or bidirectional fiber reinforcements, i.e., fibers that are substantially parallel to each other, but in crossed directions in two successive horizontal planes, with the crossing angle advantageously being equal to 90°, to provide the best mechanical properties (Composite 2D).

Exemplary ceramic fibers which are suitable reinforcing agents are, in particular, carbon, boron, alumina, alumina/silica, alumina/silica/boron, silicon carbide, silicon nitride, boron nitride and silicon carbonitride fibers. Obviously, mixtures of fibers of different ceramics may also be used as suitable reinforcing agents.

Silicon carbide ceramic fibers are especially suitable to produce composites having high thermomechanical strengths.

The amount by volume of the reinforcing agent in the composite materials of this invention advantageously ranges from 20% to 70%, preferably from 30% to 50%.

The composite materials according to the invention may be prepared utilizing techniques individually per se well known to this art.

In particular, the subject composites may be produced by conventional techniques based on impregnating a reinforcing agent (unidirectional fibers, etc.) with a slip containing the constituents required to provide the desired vitreous composition, drying the reinforcing agent or the fiber reinforcement impregnated in this manner, optionally repeating the stages of impregnating and drying until a prepreg is obtained having the desired amount by volume of fibers, and, finally, densifying such prepreg, for example by hot pressing.

In one embodiment of such process, particularly suitable for the production of Composites 1D or 2D as described above, it is also possible to stack and bond (consolidate) identical prepregs in the form of sheet composites with unidirectional fiber reinforcements, the composites being stacked either by maintaining the direction of the fibers in parallel (Composite 1D) or crossing them (Composite 2D) in the superposed sheets, followed by the sintering under pressure of the monolithic assembly obtained in this manner. This technique is described, in particular, in EP-A-128,409, (published Dec. 19, 1984 and corresponding to U.S. Pat. No. 4,696,710) hereby incorporated by reference.

The impregnating slip thus contains, in a finely dispersed state, the elements of silicon, aluminum, zirconium, alkali and alkaline earth metals in the respective weight proportions expressed as the oxides thereof, in the quantities indicated above in the inequalities (1) to (5); with all of such elements being present, after hot pressing, in the vitreous matrices of the subject composites.

These elements are in the form of a molten mass, previously obtained by mixing together and melting either the oxides of the particular elements or the precursors of these elements in the form of naturally occurring materials.

Thus, CaO may be provided by calcium silicate (Wollastonite), calcium carbonate (Aragonite, Calcite), or by calcic Feldspath (Anorthite).

MgO may be introduced by means of magnesium silicate (Steatite, Forsterite, Saphirine), magnesium aluminate (Spinel), a magnesium hydrate (Brucite) or magnesium carbonate (Magnesite).

The CaO and MgO may also be introduced together, using a double calcium and magnesium carbonate (Dolomite) or a double silicate of these elements (Diopside).

The $K_2O$ may be introduced by potassium feldspath; $SiO_2$ and $Al_2O_3$ may be introduced together by kaolin, cyanate, sillimanite, clay, or separately by quartz or an alumina hydrate (hydrargillite, boehmite).

The grain size of the powders constituting the vitreous charge of the slip is advantageously less than 50 μm and preferably less than 10 μm.

The rheological properties and the wettability of the slip are adjusted conventionally by the addition of binders and solvents of appropriate nature and in the proper proportions. The solvents are eliminated during the drying stage.

Prior to sintering the impregnated and dried prepreg, it is preferable to eliminate, either partially or completely, the various binders used in the preparation of the slip. This operation, designated scouring, is conventionally carried out by a moderate heat treatment, in air or under a neutral atmosphere, of the preform.

Densification on sintering may be carried out at a temperature ranging from 950° C. to 1,200° C. and optionally under a neutral atmosphere. The sintering may be carried out under pressure (hot pressing). In this case, the pressures used may range from 5 MPa to 25 MPa for a period of time of from 15 min to 2 hours.

In order to further illustrate the present invention and the advantages thereof, the following specific examples are given, it being understood that same are intended only as illustrative and in nowise limitative.

EXAMPLE 1

This example describes two compositions of a vitreous matrix prepared from a mixture of natural raw materials.

The constituents are indicated in weight %.

Calcium silicate (Wollastonite) provided the CaO, and magnesium silicate (Steatite) provided MgO.

Potassium feldspath provided $K_2O$; alumina and silica were provided by kaolin.

|  | Mixture A | Mixture B |
|---|---|---|
| Potassium feldspath | 25 | 35 |
| Barium carbonate | 5 | — |
| Calcium silicate | 4 | 12 |
| Steatite | 5 | 12 |
| Calcined kaolin | 20 | 11 |
| Zirconia | 10 | 5 |
| Silica | 31 | 25 |

The mixtures A and B were melted and the molten vitreous masses C and D having the following compositions were respectively obtained therefrom:

|  | Composition C | Composition D |
|---|---|---|
| $SiO_2$ | 67.9 | 70.0 |
| $Al_2O_3$ | 13.5 | 11.3 |
| $K_2O$ | 3.8 | 5.3 |
| $Na_2O$ | 0.2 | 0.2 |
| CaO | 1.9 | 5.7 |
| BaO | 3.9 | — |
| MgO | 1.6 | 3.9 |
| $ZrO_2$ | 6.8 | 3.3 |
| $Fe_2O_3$ | 0.40 | 0.3 |
| $\Sigma A_2O$ | 4.0 | 5.5 |
| $\Sigma BO$ | 7.4 | 9.6 |
| $\Sigma A_2O/\Sigma BO$ | 0.541 | 0.573 |

EXAMPLE 2

A composite material was prepared in the following manner:

Composition D of Example 1 was ground to a grain size of less than 10 μm.

The following impregnating slip was prepared:

| (i) Composition D, ground: | 9.6 kg |
|---|---|

| (ii) Polystyrene: | 0.87 kg |
|---|---|
| (iii) Paraffin: | 0.21 kg |
| (iv) Dioctylphthalate: | 0.36 kg |
| (v) Cyclohexane: | 9.9 liters |

The slip was introduced into a 10 l alumina grinder with 50 kg of alumina pellets. Grinding was continued for 15 hours.

Sheets were wound on a polygonal mandrel from SiC Nicalon roving impregnated with the above slip.

The sheets were consolidated at 0° C. to produce the Composite 1D. The material was scoured and subsequently sintered, under pressure at 1,150° C. The duration of the treatment was 1 hour. The pressure used was 10 MPa.

The material was cooled rapidly over at most 1 hour.

The principal chemical, physical, thermal and mechanical properties of the composite material obtained in this manner are reported in the following table, as are such properties of a representative prior art material.

$P_0$ is a composite material according to the invention.

$P_1$ is a composite material with a borosilicate matrix having the following composition, by weight:

| $SiO_2$ | 80.7% |
|---|---|
| $Na_2O$ | 3.8% |
| $K_2O$ | 0.4% |
| $B_2O_3$ | 12.9% |
| $Al_2O_3$ | 2.2% |

$P_2$ is a composite material with a matrix of 96% silica having the following composition, by weight:

| $SiO_2$ | 96% |
|---|---|
| $Al_2O_3$ | 2% |
| $B_2O_3$ | 2% |

|  | $P_0$ | $P_1$ | $P_2$ |
|---|---|---|---|
| $T_g$ matrix °C. | 750 | 530 | 850 |
| Compression temperature °C. | 1,150 | 1,150 | 1,600 |
| Utilization temperature limit °C. | 900 | 600 | 1,000 |
| Density | 2.5 | 2.5 | 2.3 |
| Volume fraction of fibers (%) | 40 | 40 | 35 |
| Extent of densification (%) | 100 | 100 | 100 |
| Resistance to rupture by 3-point bending at σ r MPa (measured at 20° C. and then at 900° C.) | 700<br>700 | 470<br>200 | 510<br>650 |
| Impact strength MPa $\sqrt{m}$ | 20 | 11.5 | 11.5 |

With respect to aging resistance, the material of the invention was maintained at a certain temperature for a predetermined period of time. The mechanical properties were then measured after cooling. For the material of the invention, after 300 hours at 900° C., no loss of mechanical properties was noted. Corrosion resistance was good as no loss in weight was determined after 70 hours at 20° C. in a 65% $HNO_3$ or in a 97% $H_2SO_4$ solution.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composite shaped article comprising a vitreous matrix and a reinforcing agent therefor, said vitreous matrix including silica, alumina, zirconia, an alkali metal oxide and an alkaline earth metal oxide, in the following proportions by weight relative to the total weight of such matrix:

| (1) | 50% | $\leq$ | $SiO_2$ | $\leq$ | 80% |
|---|---|---|---|---|---|
| (2) | 7% | $\leq$ | $Al_2O_3$ | $\leq$ | 20% |
| (3) | 2% | $\leq$ | $ZrO_2$ | $\leq$ | 10% |
| (4) | 2% | $\leq$ | $\Sigma A_2O$ | $\leq$ | 7% |
| (5) | 4% | $\leq$ | $\Sigma BO$ | $\leq$ | 10% | wherein $\Sigma A_2O$ and $\Sigma BO$ represent the respective total amounts by weight of the alkali metal oxides present in said matrix, wherein said matrix comprises less than 0.5% by weight $Li_2O$ and the alkaline earth metal oxides present in said matrix.

2. The composite shaped article as defined by claim 1, said vitreous matrix having a composition such that $0.2 \leq \Sigma A_2O/\Sigma BO \leq 1$.

3. The composite shaped article as defined by claim 1, said vitreous matrix having the following composition:

| 65% | $\leq$ | $SiO_2$ | $\leq$ | 75% |
|---|---|---|---|---|
| 10% | $\leq$ | $Al_2O_3$ | $\leq$ | 15% |
| 2% | $\leq$ | $ZrO_2$ | $\leq$ | 8% |
| 3% | $\leq$ | $\Sigma A_2O$ | $\leq$ | 6% |
| 6% | $\leq$ | $\Sigma BO$ | $\leq$ | 10%. |

4. The composite shaped article as defined by claim 1, said vitreous matrix having a composition such that $0.4 \leq \Sigma A_2O/\Sigma BO \leq 0.8$.

5. The composite shaped article as defined by claim 1, said vitreous matrix comprising less than 1% by weight of $Na_2O$.

6. The composite shaped article as defined by claim 5, said vitreous matrix comprising less than 0.5% of $Na_2O$.

7. The composite shaped article as defined by claim 6, $Li_2O$ content being zero.

8. The composite shaped article as defined by claim 1, comprising an amount by volume of said reinforcing agent ranging from 20% to 70%.

9. The composite shaped article as defined by claim 8, said amount by volume ranging from 30% to 50%.

10. The composite shaped article as defined by claim 1, said reinforcing agent comprising a fibrous material.

11. The composite shaped article as defined by claim 10, said fibrous material comprising ceramic fibers.

12. The composite shaped article as defined by claim 11, said ceramic fibers comprising carbon, boron, alumina, alumina/silica, alumina/silica/boron, silicon carbide, silicon nitride, boron nitride or silicon carbonitride fibers.

13. The composite shaped article as defined by claim 1, comprising a stacked array of reinforced vitreous matrices.

14. The composite shaped article as defined by claim 1, comprising a unidirectionally reinforced vitreous matrix.

15. The composite shaped article as defined by claim 1, comprising a polydirectionally reinforced vitreous matrix.

16. The composite shaped article as defined by claim 1, wherein the alkali metal oxides consist essentially of potassium oxide.

17. The composite shaped article as defined by claim 1, wherein $\Sigma BO$ is at least 6%.

18. A process for the preparation of the composite shaped article as defined by claim 1, comprising (a) impregnating the reinforcing agent with a slip containing the constituents constituting said vitreous matrix; (b) drying the thus impregnated reinforcing agent; (c) optionally repeating said impregnating and drying steps to produce a prepreg having the desired amount by volume of said reinforcing agent; (d) optionally stacking and consolidating a plurality of identical prepregs to provide larger sized mono- or polydirectional reinforced composites to produce a preform; and (e) densifying the preform.

19. The process as defined by claim 18, comprising densifying said prepreg by treating at a temperature ranging from 950° C. to 1,200° C.

20. The process as defined by claim 18, comprising densifying said prepreg by compression at a pressure ranging from 5 to 25 MPa.

* * * * *